W. R. JONES.
PEANUT PICKER AND STEMMER.
APPLICATION FILED JUNE 11, 1908.
908,271.
Patented Dec. 29, 1908.
2 SHEETS—SHEET 1.
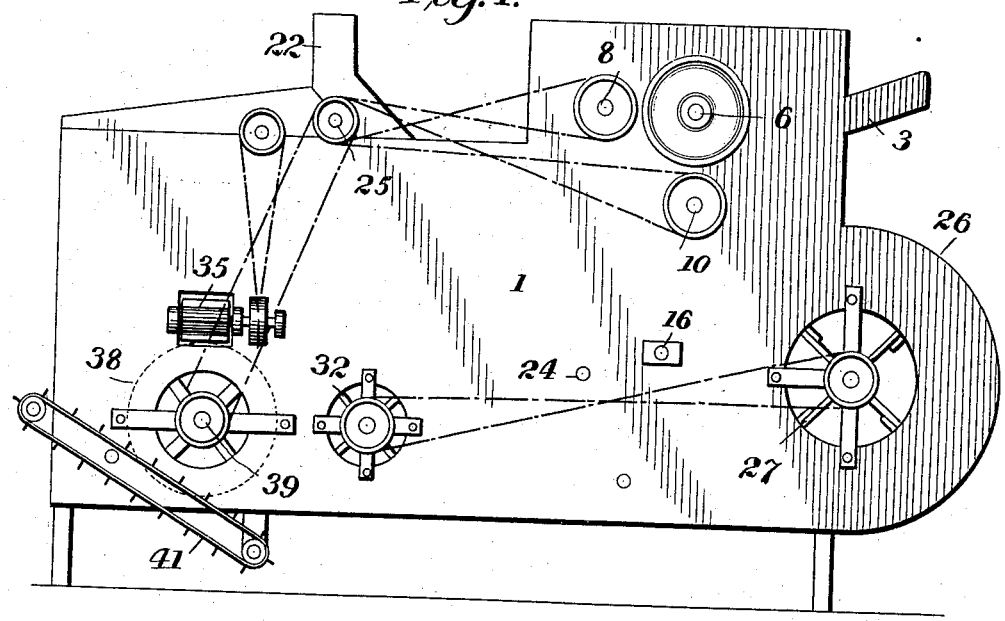
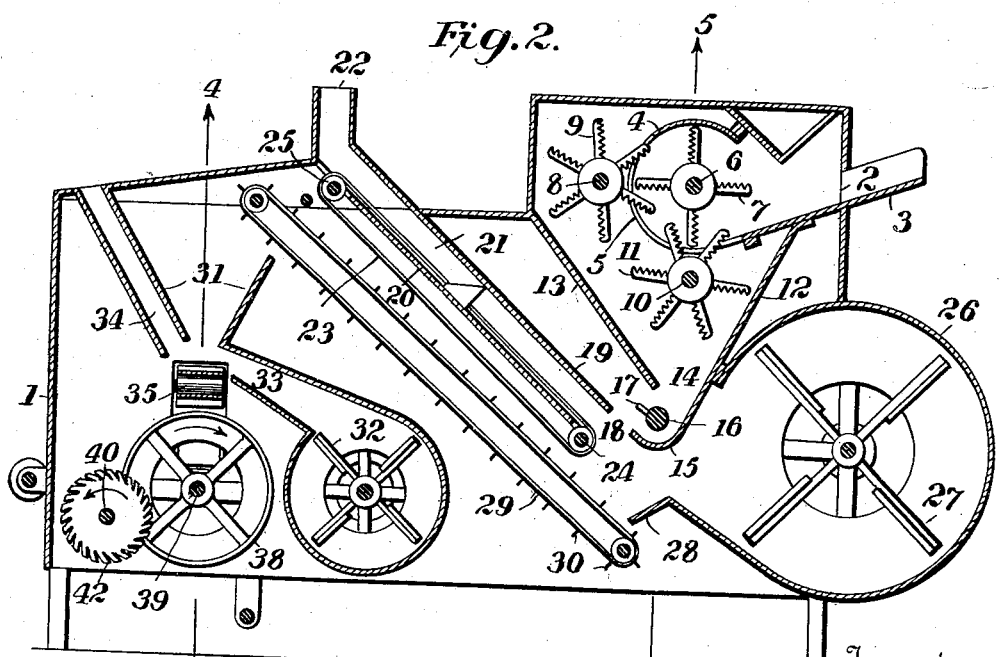

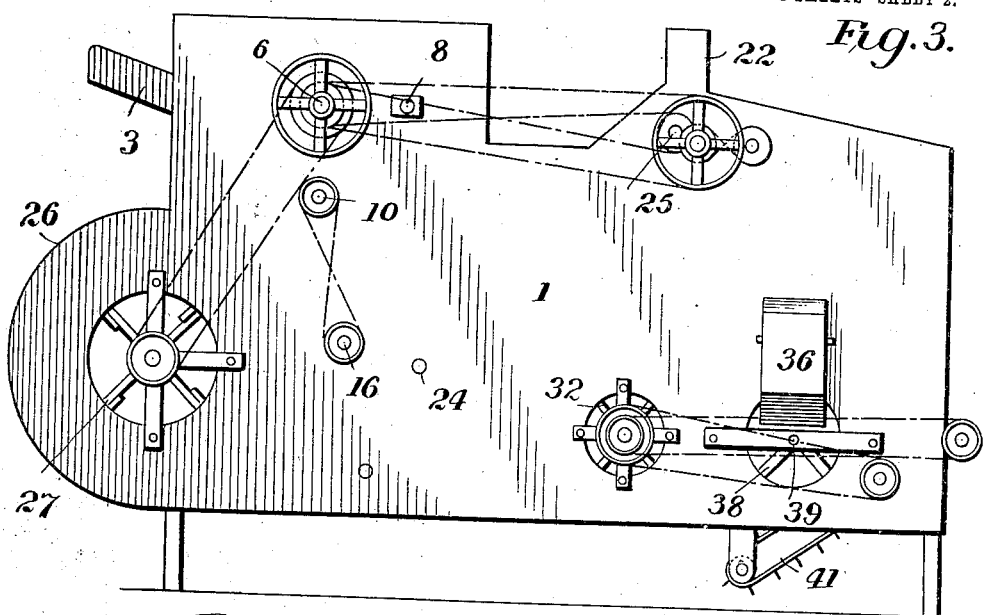
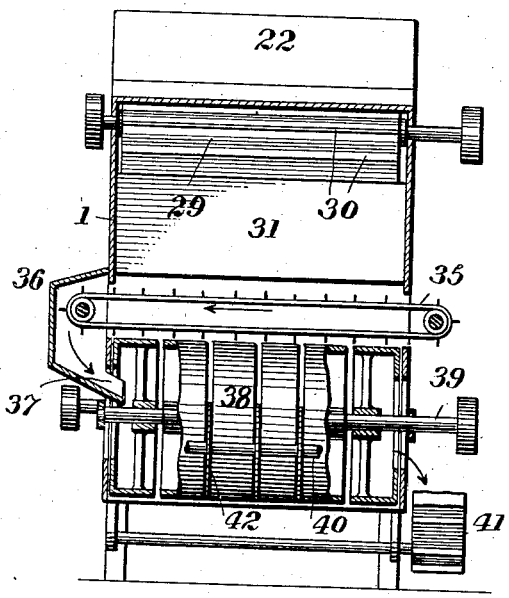
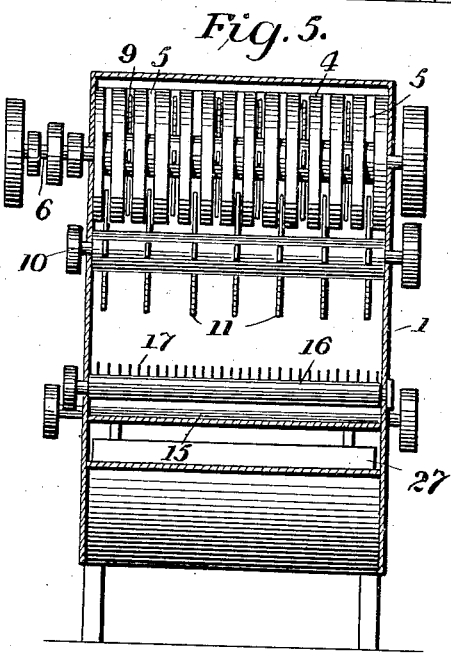

UNITED STATES PATENT OFFICE.

WILLIS R. JONES, OF SHOAL BAY, VIRGINIA.

PEANUT PICKER AND STEMMER.

No. 908,271.   Specification of Letters Patent.   Patented Dec. 29, 1908.

Application filed June 11, 1908. Serial No. 437,935.

*To all whom it may concern:*

Be it known that I, WILLIS R. JONES, a citizen of the United States, residing at Shoal Bay, Isle of Wight county, State of Virginia, have invented certain new and useful Improvements in Peanut Pickers and Stemmers, of which the following is a specification.

This invention relates to peanut pickers and stemmers, and is an improvement on what is disclosed in my prior patent No. 777,287, granted December 13, 1904. Its objects are to simplify the construction, improve the efficiency and to make a compact device which is capable of easy transportation.

To these ends the invention consists in the novel features of construction hereafter pointed out and claimed.

In the accompanying drawings: Figure 1 is a side elevation of my complete device; Fig. 2 is a longitudinal section; Fig. 3 is a side elevation of the device looking at it from the opposite side from Fig. 1; Fig. 4 is a cross section taken on the line 4—4 of Fig. 2; and Fig. 5 is a cross section taken on the line 5—5 of Fig. 2.

All of the working parts of my picker and stemmer are included within a main casing 1, and it will be observed by reference to Fig. 2 that this casing is provided with an opening 2 for the admission of the material to be acted upon, and that extending through this opening there is an inclined shelf 3 down which the material passes. At the lower edge of this shelf 3 there is a picking drum or cylinder 4 which is open on its front side to admit the material, and which is provided with circumferential slots 5 extending part way around it. Centrally within this drum there is a rotary shaft 6 carrying the radial arms 7 which rotate within the cylinder and near the circumference thereof, and which are provided with picking teeth. Immediately to the rear of the drum 4 and on the same level with the shaft 6 there is a shaft 8 having radial arms 9 which enter the slots 5 in the cylinder 4. Immediately beneath the cylinder there is a rotary shaft 10 having radial arms 11 entering the slots 5 in the cylinder. The inclined walls 12 and 13 beneath the above mentioned parts make a V-shaped chute to receive the material discharged from the picking mechanism, and that material passes out through the opening 14 at the bottom of this chute. The wall 12 is continued in the form of a semicircular lip 15 beneath the outlet 14, and there is a regulating feed roll 16 mounted immediately above this lip, and having projections 17 to positively feed the material to the opening 18, thus preventing the choking of the material.

In line with the end of the lip 15 there is an upwardly inclined plate 19, and separated from that plate there is a plate 20 forming the discharge flue 21 for trash which has a discharge opening 22 at the top of the machine. In this discharge flue I place a belt conveyer 23 moving on the rollers 24, 25. Below the picking mechanism and to one side of the plate 12 there is a drum 26 having within it the fan 27 which creates an air current passing across the outlet 18 and up the trash flue 21.

It will be apparent that the material dropping through the opening 18 will come in contact with this air blast and that the trash will be separated from the heavy peanuts, the trash being carried out through the flue 21, and the peanuts passing through the air blast and falling upon the ledge 28, and the upwardly inclined belt conveyer 29 which has ribs 30 thereon to receive the peanuts. This conveyer 29 delivers the peanuts at the rear upper part of the machine to a second chute 31, and there is within the machine adjacent this chute a fan 32 which creates an air current passing through the passage 33 directly across the outlet of the chute 31 and into the dischage flue 34 leading at an inclination to the top of the machine. This air blast passing across the bottom of the chute carries with it all remaining trash, and also defective peanuts or "saps."

The peanuts themselves pass through the air current and fall upon the conveyer 35 extending transversely of the machine, and they are carried to the end of that conveyer and delivered into the inclined chute 36 at the side of the machine, which chute has a spout 37 leading into the open end of the hollow stemming cylinder 38.

The stemming cylinder 38 is in reality made up of a number of short cylinders connected together upon a common shaft 39 and separated slightly so as to form slots between them. Parallel with the shaft 39 there is a shaft 40 carrying a number of toothed wheels or saws rotating within the slots formed in the cylinder 38. These wheels rotate in the opposite direction from the cylinder 38, and the teeth come in contact with the peanuts operating to stem them. The peanuts themselves pass along the cylinder and are discharged at the opposite end falling on the conveyer 41 which carries them off to a suitable receptacle.

It will be observed that the shafts 8 and 10 revolve in an opposite direction from the shaft 6, and the means for connecting together the various rotating shafts and conveyers are clearly shown in Figs. 1 and 3, where the dotted lines represent belts connecting the pulleys on the various shafts.

Having thus described the invention, what is claimed is:

1. In a device of the class described, the combination with picking mechanism, of a V-shaped discharge chute beneath said mechanism, one wall of said chute being curved at the bottom to form a semicircular lip, a rotary regulating feed roll in the discharge outlet above said lip, a discharge flue for trash the top wall of which is in line with said lip, means for discharging a current of air beneath said lip and through said flue, stemming mechanism, and means for conveying the peanuts dropping through said air current to said stemming mechanism.

2. In a device of the class described, the combination with picking mechanism, of a V-shaped discharge chute beneath said mechanism, means for discharging an air blast across the outlet of said chute to carry away trash, an upwardly inclined flue having an open end adjacent the discharge opening of said chute and in position to receive the air blast, a belt conveyer traveling along the bottom of said flue, and an upwardly inclined conveyer beneath the said flue and passing beneath the discharge opening of the chute to receive peanuts therefrom.

3. In a device of the class described, the combination with a casing, of peanut picking mechanism therein, a discharge chute beneath said mechanism, pneumatic means for separating the peanuts and trash as they are discharged from said chute, a conveyer for carrying the peanuts to the upper part of the casing, a second chute into which the peanuts are discharged, and pneumatic means for separating remaining trash and light or defective peanuts from the good peanuts as they pass out of this second chute.

4. In a device of the class described, the combination with a casing, of peanut picking mechanism therein, a discharge chute beneath said mechanism, pneumatic means for separating the peanuts and trash as they are discharged from said chute, a conveyer for carrying the peanuts to the upper part of the casing, a second chute into which the peanuts are discharged, pneumatic means for separating remaining trash and light or defective peanuts from the good peanuts as they pass out of this second chute, a stemmer within the casing beneath this second chute, and means for conveying the peanuts to said stemmer.

5. In a device of the class described, the combination with a casing, of peanut picking mechanism therein, pneumatic means for separating the trash from the peanuts, a hollow stemming drum within said casing below the discharge outlet of said separating means, and a conveyer above said drum and beneath said outlet leading to and discharging into the end of said hollow drum.

6. In a device of the class described, the combination with a casing, of peanut picking mechanism therein, pneumatic means for separating the trash from the peanuts, a hollow stemming drum within said casing below the discharge outlet of said separating means, a belt conveyer above said drum extending longitudinally thereof and beneath said outlet, and a curved chute at the side of said casing leading from the end of said conveyer into the end of said hollow drum.

7. In a device of the class described the combination with a casing, of picking mechanism in said casing, a chute below said mechanism to receive the material therefrom, means for creating an air current and discharging it across the outlet of said chute, a discharge flue for trash through which said air current passes, a conveyer receiving the peanuts beneath the outlet of said chute, a second chute into which said conveyer discharges, means for creating an air current across the discharge outlet of said second chute, a flue receiving said air current and carrying away trash and defective peanuts, a conveyer receiving the peanuts from said second chute, and a stemmer into which said conveyer discharges.

8. In a device of the class described, a peanut stemmer comprising a hollow cylindrical rotary drum having circumferential slots through its wall, rotary toothed wheels extending into said drum through said slots, means for supplying peanuts at one end of the drum, and means for discharging said peanuts at the other end of the drum.

9. In a device of the class described, a peanut stemmer comprising a hollow cylindrical rotary drum having circumferential slots through its wall, a shaft parallel with said drum carrying stemming wheels extending into the slots of said drum.

In testimony whereof I affix my signature in presence of two witnesses.

WILLIS R. JONES.

Witnesses:
H. M. MITCHELL,
JAMES P. COX.